(12) United States Patent
Zhou et al.

(10) Patent No.: US 12,505,533 B2
(45) Date of Patent: Dec. 23, 2025

(54) DISPLAY DEFECT DETECTION APPARATUS AND DETECTION METHOD, DISPLAY DEFECT DETECTION SYSTEM, AND ELECTRONIC DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Qiaoke Zhou, Beijing (CN); Bo Li, Beijing (CN); Jing Wang, Beijing (CN); Xiang Li, Beijing (CN); Guojian Qu, Beijing (CN); Bochang Wang, Beijing (CN); Tanhong Zhao, Beijing (CN); Hui Guo, Beijing (CN)

(73) Assignees: BEIJING BOE DISPLAY TECHNOLOGY CO., LTD, Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 436 days.

(21) Appl. No.: 18/014,838

(22) PCT Filed: Nov. 11, 2021

(86) PCT No.: PCT/CN2021/130068
§ 371 (c)(1),
(2) Date: Jan. 6, 2023

(87) PCT Pub. No.: WO2022/227491
PCT Pub. Date: Nov. 3, 2022

(65) Prior Publication Data
US 2023/0274411 A1 Aug. 31, 2023

(30) Foreign Application Priority Data

Apr. 27, 2021 (CN) .......................... 202110461828.7

(51) Int. Cl.
*G06T 7/00* (2017.01)
*G06T 5/70* (2024.01)
(Continued)

(52) U.S. Cl.
CPC ................ *G06T 7/001* (2013.01); *G06T 5/70* (2024.01); *G06V 10/20* (2022.01); *G06V 10/60* (2022.01);
(Continued)

(58) Field of Classification Search
CPC ......... G06T 7/001; G06T 5/70; G06T 7/0004; G06T 2207/20084; G06T 2207/30108;
(Continued)

(56) References Cited

U.S. PATENT DOCUMENTS

2019/0204499 A1    7/2019  Zhang
2021/0407446 A1*  12/2021  Wang .................. G09G 3/3611

FOREIGN PATENT DOCUMENTS

CN    104900178 B  * 10/2017
CN    108108768 A    6/2018
(Continued)

OTHER PUBLICATIONS

Zosso, Dominique, et al. "Two-dimensional compact variational mode decomposition: Spatially compact and spectrally sparse image decomposition and segmentation." Journal of mathematical imaging and vision 58 (2017): 294-320. (Year: 2017).*
(Continued)

*Primary Examiner* — Henok Shiferaw
*Assistant Examiner* — Toluwani Mary-Jane Ijaseun
(74) *Attorney, Agent, or Firm* — XSENSUS LLP

(57) ABSTRACT

A display defect detection method, includes: collecting at least one display image of at least one display to be detected; extracting a plurality of band-limited intrinsic mode function components from a display image in the at least one display
(Continued)

image by using a complex variational mode decomposition method; extracting and fusing the plurality of band-limited intrinsic mode function components of the display image by using a convolutional neural network, so as to obtain an average brightness value and a brightness uniformity of the display image; and determining whether a display to be detected in the at least one display to be detected corresponding to the display image is qualified according to a preset classification rule and the average brightness value and the brightness uniformity of the display image.

20 Claims, 9 Drawing Sheets

(51) Int. Cl.
    *G06V 10/20*     (2022.01)
    *G06V 10/60*     (2022.01)
    *G06V 10/764*     (2022.01)
    *G06V 10/82*     (2022.01)

(52) U.S. Cl.
    CPC ............ *G06V 10/764* (2022.01); *G06V 10/82* (2022.01); *G06T 2207/20084* (2013.01); *G06T 2207/30108* (2013.01)

(58) Field of Classification Search
    CPC .......... G06T 2207/30121; G06V 10/20; G06V 10/60; G06V 10/764; G06V 10/82; G06V 10/30; G01N 21/95; G06F 18/24; G06F 18/253; G06N 3/045
    See application file for complete search history.

(56) References Cited

FOREIGN PATENT DOCUMENTS

| | | | |
|---|---|---|---|
| CN | 108873399 A | 11/2018 | |
| CN | 109636772 A | 4/2019 | |
| CN | 109978867 A | 7/2019 | |
| CN | 110069886 A | 7/2019 | |
| CN | 110299114 A | 10/2019 | |
| CN | 108227066 B | 6/2020 | |
| CN | 111583225 A | 8/2020 | |
| CN | 112070762 A | 12/2020 | |
| CN | 212135112 U | 12/2020 | |
| CN | 112179653 A | 1/2021 | |
| CN | 113218962 A | 8/2021 | |
| JP | 2006-145228 A | 6/2006 | |
| WO | WO-2020258927 A1 * | 12/2020 | ........... G09G 3/3406 |

OTHER PUBLICATIONS

Ma, Zhongqiang, and Jun Gong. "An automatic detection method of Mura defects for liquid crystal display." 2019 Chinese Control Conference (CCC). IEEE, 2019. (Year: 2019).*
Jo, Junho, et al. "Local backlight dimming for liquid crystal displays via convolutional neural network." 2020 Asia-Pacific Signal and Information Processing Association Annual Summit and Conference (APSIPA ASC). IEEE, 2020. (Year: 2020).*
Faisal, Kazi Newaj, Ujjawal Chandela, and Rishi Raj Sharma. "Two-Dimensional Successive Variational Mode Decomposition." IEEE Signal Processing Letters (2025). (Year: 2025).*
Lee, Janghwan. "16â4: Invited Paper: RegionaBased Machine Learning for OLED Mura Defects Detection." SID Symposium Digest of Technical Papers. vol. 52. No. 1. 2021. (Year: 2021).*
Jiang, Jiabin, et al. "Surface defect detection for mobile phone back glass based on symmetric convolutional neural network deep learning." Applied Sciences 10.10 (2020): 3621. (Year: 2020).*
Lin, Hui, et al. "Automated defect inspection of LED chip using deep convolutional neural network." Journal of Intelligent Manufacturing 30.6 (2019): 2525-2534. (Year: 2019).*
Guedidi, A., et al. "Bearing faults classification based on variational mode decomposition and artificial neural network." 2019 IEEE 12th international symposium on diagnostics for electrical machines, power electronics and drives (SDEMPED). IEEE, 2019. (Year: 2019).*
Seismic Data Reconstruction Based On Adaptive Sparse Inversion, Mar. 2017, pp. 5-8 & 58-61.
Sun Yufeng, Research on Visual Detection Algorithm for Mura Defect of AMOLED Display Panel, Jan. 2019, pp. 1-53, Harbin Institute of Technology.
Research on Blind Source Separation Method of Bearing Vibration Signal Based on CVMD Decomposition, Jun. 4, 2019, pp. 1-82.
Office Action for the Chinese Patent Application No. 202110461828.7 issued by the Chinese Patent Office on Jul. 29, 2022.

* cited by examiner

DISPLAY DEFECT DETECTION APPARATUS AND DETECTION METHOD, DISPLAY DEFECT DETECTION SYSTEM, AND ELECTRONIC DEVICE

CROSS-REFERENCE TO RELATED APPLICATIONS

This application is a national phase entry under 35 USC 371 of International Patent Application No. PCT/CN 2021/130068 filed on Nov. 11, 2021, which claims priority to Chinese Patent Application No. 202110461828.7, filed on Apr. 27, 2021, which are incorporated herein by reference in their entirety.

TECHNICAL FIELD

The present disclosure relates to the field of display technologies, and in particular, to a display defect detection apparatus and detection method, and a display defect detection system.

BACKGROUND

A side light type backlight source is used in a backlight module of a display. The backlight module includes the backlight source and a light guide plate, and the backlight source is disposed on a side of the light guide plate. Light emitted from the backlight source is transmitted to a display panel of the display through the light guide plate.

However, the side light type backlight source causes the display to display a picture with a large brightness in a region close to the backlight source and a small brightness in a region away from the backlight source, so that the display picture shows a phenomenon of uneven brightness (i.e., Hotspot phenomenon).

SUMMARY

In an aspect, a display defect detection method is provided. The display defect detection method includes as follows.

At least one display image of at least one display to be detected is collected.

A plurality of band-limited intrinsic mode function components are extracted from a display image in the at least one display image by using a complex variational mode decomposition method.

The plurality of band-limited intrinsic mode function components of the display image are extracted and fused by using a convolutional neural network, so as to obtain an average brightness value and a brightness uniformity of the display image.

It is determined whether a display to be detected in the at least one display to be detected corresponding to the display image is qualified according to a preset classification rule and the average brightness value and the brightness uniformity of the display image.

In some embodiments, the preset classification rule includes: if the average brightness value of the display image is greater than or equal to a preset brightness value, and the brightness uniformity of the display image is greater than or equal to a preset brightness uniformity, determining that the display to be detected corresponding to the display image is qualified; and if not, determining that the display to be detected corresponding to the display image is unqualified.

In some embodiments, before collecting the at least one display image of the at least one display to be detected, the display defect detection method further includes as follows.

Display images of a plurality of sample displays are collected as sample images, and reference results of whether the sample displays corresponding to respective sample images are qualified are obtained.

It is determined whether a sample display in the plurality of sample displays that each sample image corresponds to is qualified by using the convolutional neural network, so as to obtain actual detection results of whether the plurality of sample displays are qualified. The convolutional neural network includes detection parameters.

An actual detection result of a sample display in the plurality of sample displays is compared with a respective reference result to determine whether the actual detection result is consistent with the respective reference result, and the detection parameters of the convolutional neural network are adjusted according to a comparison result.

The detection parameters of the convolutional neural network are adjusted repeatedly, until the actual detection results of the plurality of sample displays are stable.

In some embodiments, before determining whether the sample display that each sample image corresponds to is qualified by using the convolutional neural network, the display defect detection method further includes: extracting a plurality of band-limited intrinsic mode function components from the sample image by using the complex variational mode decomposition method.

In some embodiments, determining whether the sample display that each sample image corresponds to is qualified by using the convolutional neural network, includes as follows.

The plurality of band-limited intrinsic mode function components of the sample image are extracted and fused by using the convolutional neural network, so as to obtain an average brightness value and a brightness uniformity of the sample image.

It is determined whether the sample display corresponding to the sample image is qualified according to the preset classification rule and the average brightness value and the brightness uniformity of the sample image.

In some embodiments, comparing the actual detection result of the sample display with the respective reference result to determine whether the actual detection result is consistent with the respective reference result, and adjusting the detection parameters of the convolutional neural network according to the comparison result, include: if the actual detection result of the sample display is inconsistent with the respective reference result, adjusting the detection parameters of the convolutional neural network.

In some embodiments, the detection parameters include a kernel function parameter and a penalty parameter.

In some embodiments, after collecting the at least one display image of the at least one display to be detected, the display defect detection method further includes: preprocessing the display image. The preprocessing includes at least one of image cropping, graying and filtering.

In some embodiments, after collecting the at least one display image of the at least one display to be detected, the display defect detection method further includes: disposing a plurality of monitoring points on the display image; and obtaining brightness information of the plurality of monitoring points. The plurality of monitoring points are arranged in an array. A distance between two adjacent monitoring points in a first direction is substantially equal to a distance between two adjacent monitoring points in a second direction. The first direction and the second direction intersect.

In some embodiments, extracting the plurality of band-limited intrinsic mode function components from the display image by using the complex variational mode decomposition method, includes as follows.

Brightness information of each monitoring point on the display image is decomposed into a plurality of modal components by using the complex variational mode decomposition method.

At least one noise component in the plurality of modal components of the monitoring point is removed to extract band-limited intrinsic mode function components in the plurality of modal components of the monitoring point.

In some embodiments, extracting and fusing the plurality of band-limited intrinsic mode function components of the display image by using the convolutional neural network to obtain the average brightness value and the brightness uniformity of the display image, includes as follows.

Band-limited intrinsic mode function components of brightness information of a monitoring point in the plurality of monitoring points on the display image are extracted by using the convolutional neural network, so that a brightness corresponding to the band-limited intrinsic mode function components of the monitoring point is used as the average brightness value of the display image.

Alternatively, band-limited intrinsic mode function components of brightness information of at least two monitoring points in the plurality of monitoring points on the display image are extracted by using the convolutional neural network. An average value of brightnesses corresponding to the band-limited intrinsic mode function components of the brightness information of the at least two monitoring points is calculated as the average brightness value of the display image.

Alternatively, the display image is in a shape of a polygon. Band-limited intrinsic mode function components of brightness information of monitoring points including, located at each corner of the display image, at least one corresponding monitoring point in the plurality of monitoring points, and band-limited intrinsic mode function components of brightness information of a monitoring point in the plurality of monitoring points located at a center of the display image are extracted by using the convolutional neural network. An average value of brightnesses corresponding to the extracted band-limited intrinsic mode function components of the brightness information of the monitoring points including, located at each corner, the at least one corresponding monitoring point, and the monitoring point located at the center, is calculated as the average brightness value of the display image.

In some embodiments, extracting and fusing the plurality of band-limited intrinsic mode function components of the display image by using the convolutional neural network to obtain the average brightness value and the brightness uniformity of the display image, includes: extracting band-limited intrinsic mode function components of a monitoring point with least brightness information in the plurality of monitoring points and band-limited intrinsic mode function components of a monitoring point with most brightness information in the plurality of monitoring points; and calculating a ratio of a brightness corresponding to the band-limited intrinsic mode function components of the monitoring point with least brightness information to a brightness corresponding to the band-limited intrinsic mode function components of the monitoring point with most brightness information, so as to obtain the brightness uniformity of the display image.

In another aspect, a display defect detection apparatus is provided. The display defect detection apparatus includes a feature extractor and a convolutional neural network classifier.

The feature extractor is coupled to an image collector. The feature extractor is configured to: obtain at least one display image of at least one display to be detected collected by the image collector; and extract a plurality of band-limited intrinsic mode function components from a display image in the at least one display image by using a complex variational mode decomposition method.

The convolutional neural network classifier is coupled to the feature extractor. The convolutional neural network classifier is configured to: extract and fuse the plurality of band-limited intrinsic mode function components, so as to obtain an average brightness value and a brightness uniformity of the display image; and determine whether a display to be detected in the at least one display to be detected corresponding to the display image is qualified according to a preset classification rule and the average brightness value and the brightness uniformity of the display image.

In some embodiments, the display defect detection apparatus further includes a preprocessor. The preprocessor is coupled between the image collector and the feature extractor. The preprocessor is configured to: obtain the display image of the display to be detected collected by the image collector; preprocess the display image; and transmit the preprocessed display image to the feature extractor. The preprocessing includes at least one of image cropping, graying and filtering.

In yet another aspect, a display defect detection system is provided. The display defect detection system includes an image collector, and the display defect detection apparatus in any one of the above embodiments. The display defect detection apparatus is coupled to the image collector. The image collector is configured to collect at least one display image of at least one display to be detected.

In yet another aspect, an electronic device is provided. The electronic device includes a memory and a processor. The memory stores computer program instructions. The processor is configured to run the computer program instructions to execute the display defect detection method in any one of the above embodiments.

In yet another aspect, a non-transitory computer-readable storage medium is provided. The non-transitory computer-readable storage medium stores computer program instructions. When the computer program instructions run on a processor, the processor executes the display defect detection method in any one of the above embodiments.

In yet another aspect, a computer program product is provided. The computer program product includes computer program instructions. When the computer program instructions are executed on a computer, the computer program instructions cause the computer to execute the display defect detection method in any one of the above embodiments.

In yet another aspect, a computer program is provided. When the computer program is executed on a computer, the computer program causes the computer to execute the display defect detection method in any one of the above embodiments.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on an actual size of a product an actual process of a method, and an actual timing of a signal involved in the embodiments of the present disclosure.

DETAILED DESCRIPTION

Figure 1:
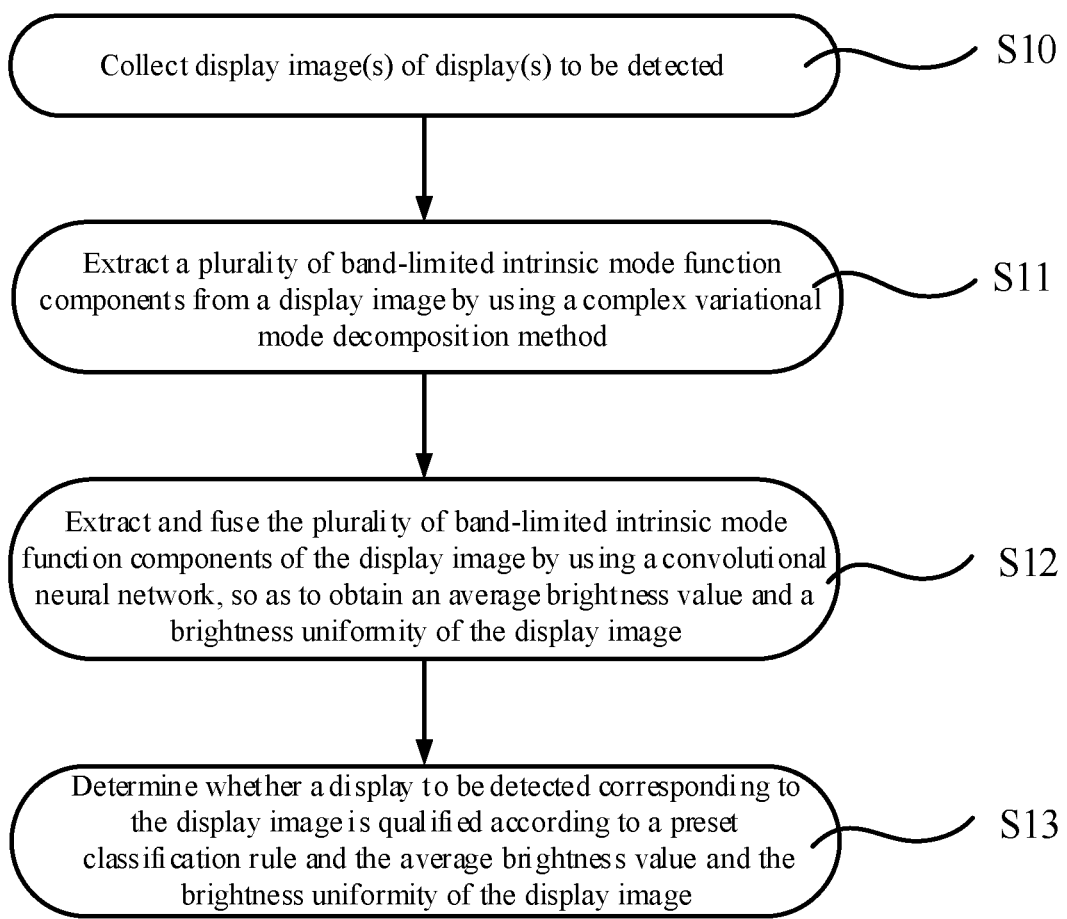
FIGS. 1 to 5 each are a flow diagram of a display defect detection method, in accordance with some embodiments of the present disclosure.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment," "some embodiments," "exemplary embodiments," "an example," "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are only used for descriptive purposes, and are not to be construed as indicating or implying relative importance or implicitly indicating the number of indicated technical features. Thus, a feature defined with "first" or "second" may explicitly or implicitly include one or more of the features. In the description of the embodiments of the present disclosure, the term "a plurality of/the plurality of" means two or more unless otherwise specified.

In the description of some embodiments, the term "coupled" and extensions thereof are used. For example, the term "coupled" is used in the description of some embodiments to indicate that two or more components are in direct physical or electrical contact with each other.

The phrase "A and/or B" includes following three combinations: only A, only B, and a combination of A and B.

The use of the phase "configured to" herein means an open and inclusive expression, which does not exclude devices that are applicable to or configured to perform additional tasks or steps.

In addition, the use of the phase "based on" means openness and inclusiveness, since a process, step, calculation or other action that is "based on" one or more stated conditions or values may, in practice, be based on additional conditions or values exceeding those stated.

As used herein, the term "substantially" includes a stated value and an average value within an acceptable range of deviation of a particular value. The acceptable range of deviation is determined by a person of ordinary skill in the art, considering measurement in question and errors associated with measurement of a particular quantity (i.e., limitations of a measurement system).

Exemplary embodiments are described herein with reference to sectional views and/or plan views as idealized exemplary drawings. In the accompanying drawings, thicknesses of layers and sizes of regions are enlarged for clarity. Thus, variations in shape relative to the accompanying drawings due to, for example, manufacturing techniques and/or tolerances may be envisaged. Therefore, the exemplary embodiments should not be construed to be limited to the shapes of regions shown herein, but to include deviations in shape due to, for example, manufacturing. For example, an etched region shown in a rectangular shape generally has a curved feature. Therefore, the regions shown in the accompanying drawings are schematic in nature, and their shapes are not intended to show actual shapes of the regions in a device, and are not intended to limit the scope of the exemplary embodiments.

In the related art, an artificial vision detection method is generally used for the Hotspot phenomenon of the display picture of the display. However, this method is easily interfered by human subjective factors and external environment, and lacks unified criteria for quantification of the Hotspot phenomenon, so that an accuracy of detecting the Hotspot phenomenon cannot be ensured.

Based on this, some embodiments of the present disclosure provide a display defect detection method. As shown in FIG. 1, the display defect detection method includes following S10 to S13.

In S10, display image(s) of display(s) to be detected are collected.

It can be understood that the display image is an image displayed on a display screen of the display to be detected.

For example, display images of 95 to 105 displays to be detected may be collected as test images.

In S11, a plurality of band-limited intrinsic mode function (BLIMF) components are extracted from the display image by using a complex variational mode decomposition (CVMD) method.

Figure 6:
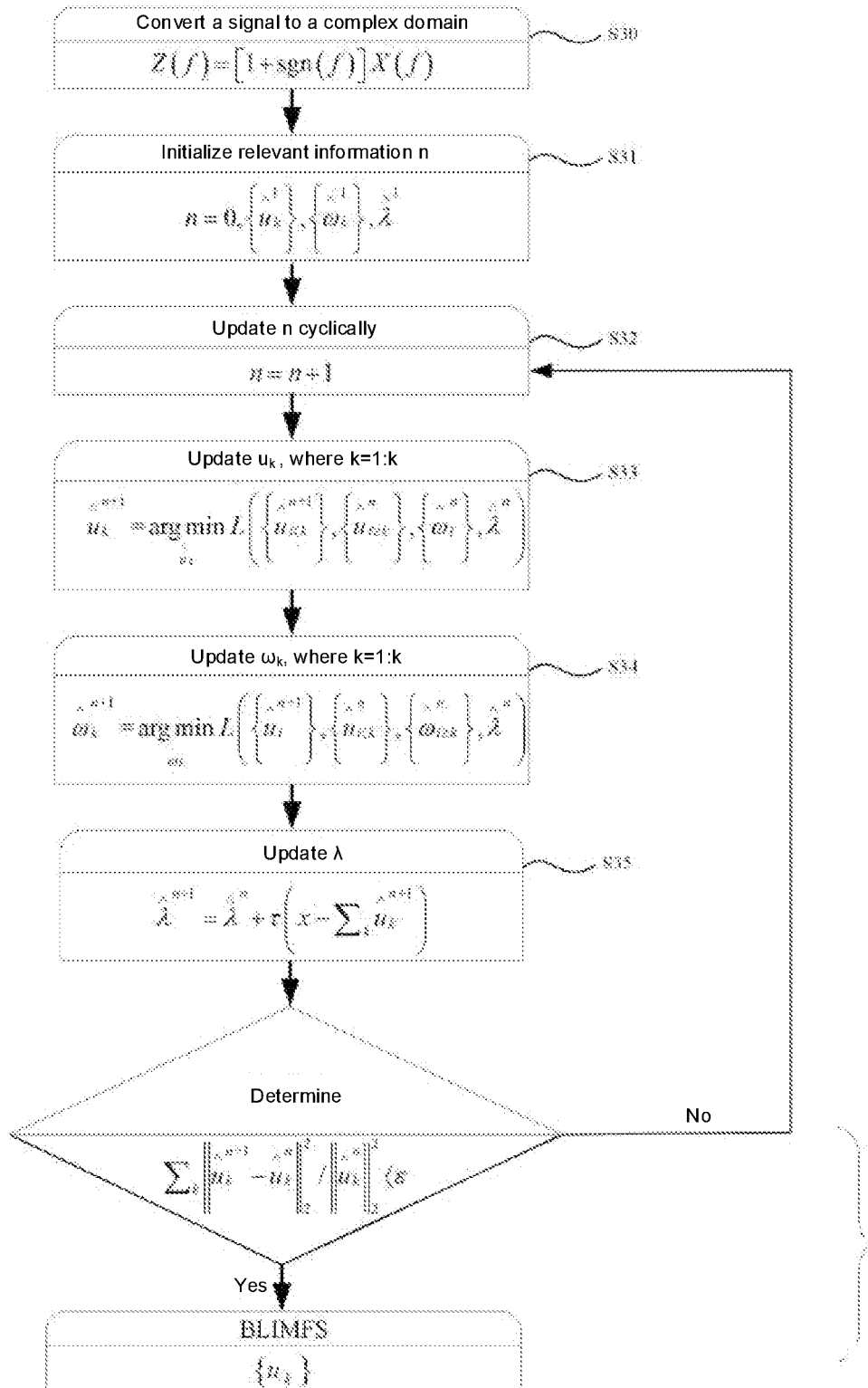
FIG. 6 is a workflow diagram of a complex variational mode decomposition of a detection method of a display defect, in accordance with some embodiments of the present disclosure.

It will be noted that the complex variational mode decomposition method requires an establishment of an overall framework shown in FIG. 6, so as to decompose signals of the display image by iterating out center frequencies and bandwidths of respective modal components. The complex variational mode decomposition method shows a good robustness to noise signals, and may be applied to decomposition of low signal-to-noise ratio signals and removal of noise signals in the signals of the display image.

In a process of decomposing the signals of the display image, for the complex variational mode decomposition method, the number of required modal components may be artificially set, so that a redundancy of the modal components is reduced. Compared with an empirical mode decomposition (EMD) method and an improved algorithm thereof, the complex variational mode decomposition method solves problems of endpoint effect and modal component mixing of the empirical mode decomposition method in view of the decomposition result.

In S12, the plurality of band-limited intrinsic mode function components of the display image are extracted and fused by using a convolutional neural network (CNN), so as to obtain an average brightness value and a brightness uniformity of the display image.

It will be noted that the convolutional neural network is one of core algorithms in the field of image recognition, and is a neural network for processing data with similar network structure. The convolutional neural network includes an input layer, a hidden layer and an output layer.

Moreover, the "average brightness value" represents an overall brightness of the display image, which may be a brightness value of any region of the display image or an average of brightness values of a plurality of regions of the display image.

The "brightness uniformity" represents an overall brightness uniformity of the display image, and the greater the brightness uniformity, the better the overall brightness uniformity of the display image.

The plurality of band-limited intrinsic mode function components of the display image are extracted and fused by using the convolutional neural network, so that determination features of the display image, i.e., the average brightness value and the brightness uniformity of the display image, are obtained.

In S13, it is determined whether the display to be detected corresponding to the display image is qualified according to a preset classification rule and the average brightness value and the brightness uniformity of the display image.

It can be understood that the "preset classification rule" gives a classification rule of the determination features of the display image, i.e., a classification rule for the average brightness value and the brightness uniformity of the display image. The preset classification rule will be described below.

According to the preset classification rule, if the average brightness value and the brightness uniformity of the display image satisfy the preset classification rule (which indicates that the Hotspot phenomenon of the display image is slight, and does not affect the display quality of the display), the display to be detected corresponding to the display image is determined to be qualified; and if the average brightness value and the brightness uniformity of the display image do not satisfy the preset classification rule (which indicates that the Hotspot phenomenon of the display image is serious, and affects the display quality of the display), the display to be detected corresponding to the display image is determined to be unqualified.

In the above detection method, the plurality of band-limited intrinsic mode function components are extracted from the display image by using the complex variational mode decomposition method, so that the noise signals in the signals of the display image may be removed.

The plurality of band-limited intrinsic mode function components are extracted and fused by using the convolutional neural network, so as to obtain the average brightness value and the brightness uniformity of the display image for determining the display image. The average brightness value and the brightness uniformity of the display image are determined by using the unified preset classification rule, so as to realize the detection of the Hotspot phenomenon of the display image, thereby determining whether the display to be detected corresponding to the display image is qualified through the detection of the Hotspot phenomenon of the display image.

In some embodiments, the preset classification rule includes as follows. If the average brightness value of the display image is greater than or equal to a preset brightness value, and the brightness uniformity of the display image is greater than or equal to a preset brightness uniformity, the display to be detected corresponding to the display image is determined to be qualified; if not, the display to be detected corresponding to the display image is determined to be unqualified.

It will be noted that the "preset brightness value" refers to a brightness value of the display image that satisfies a standard, and is used for determining whether the average brightness value of the display image satisfies the standard. If the average brightness value of the display image is greater than or equal to the preset brightness value, the average brightness value of the display image is determined to satisfy the standard; and if the average brightness value of the display image is less than the preset brightness value, the average brightness value of the display image is determined not to satisfy the standard.

The "preset brightness uniformity" refers to a brightness uniformity of the display image that satisfies a standard, and is used for determining whether the brightness uniformity of the display image satisfies the standard. If the brightness uniformity of the display image is greater than or equal to the preset brightness uniformity, the brightness uniformity of the display image is determined to satisfy the standard; and if the brightness uniformity of the display image is less than the preset brightness uniformity, the brightness uniformity of the display image is determined not to satisfy the standard.

In a case where the average brightness value of the display image satisfies the standard, and the brightness uniformity of the display image satisfies the standard, the display to be detected corresponding to the display image is determined to be qualified. In a case where the average brightness value of the display image does not satisfy the standard, or the brightness uniformity of the display image does not satisfy the standard, or the average brightness value and the brightness uniformity of the display image do not satisfy respective standards, the display to be detected corresponding to the display image is determined to be unqualified.

Figure 4:
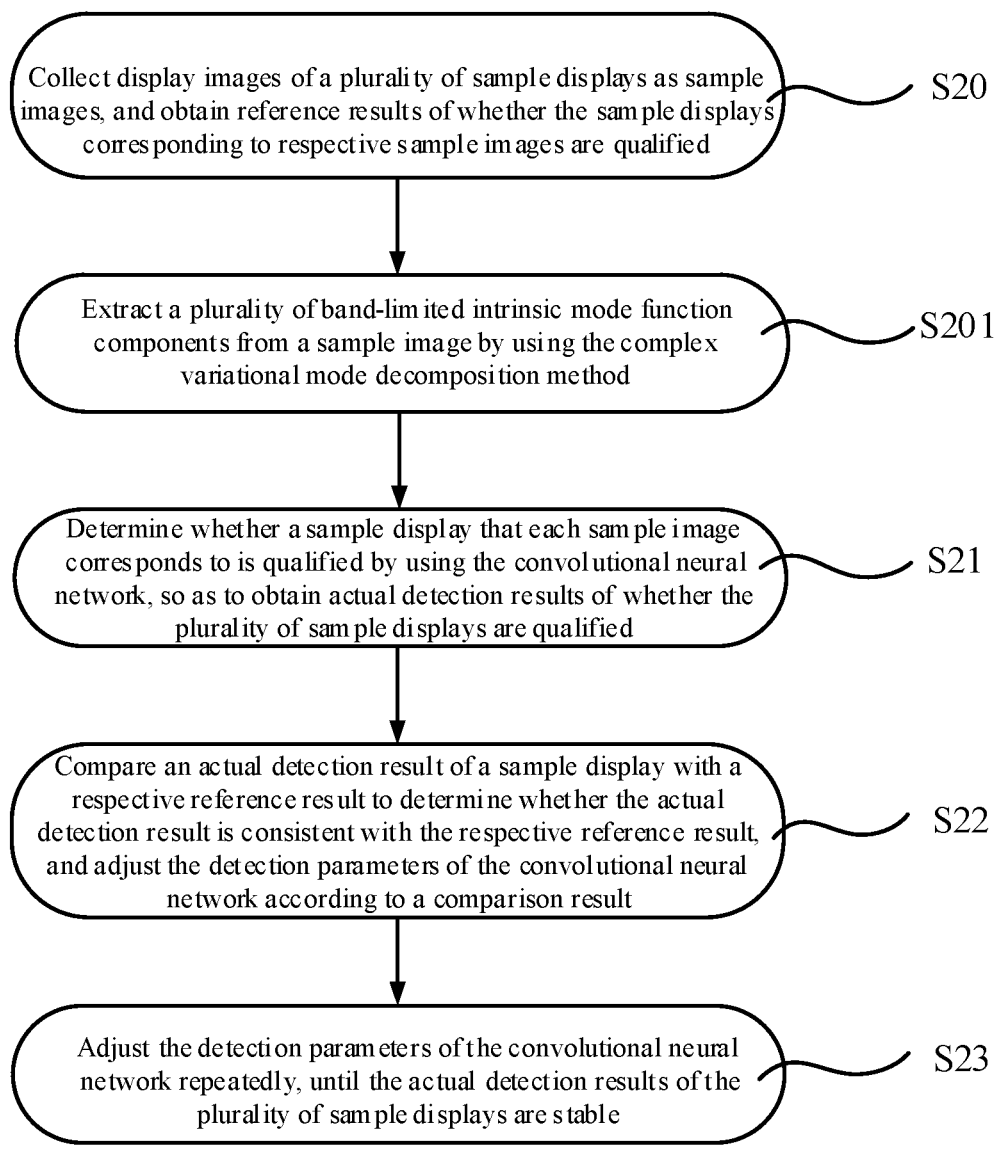

In some embodiments, before the display image(s) of the display(s) to be detected are collected in S10, as shown in FIG. 4, the display defect detection method further includes following S20 to S23.

In S20, display images of a plurality of sample displays are collected as sample images, and reference results of whether the sample displays corresponding to respective sample images are qualified are obtained.

It can be understood that the sample image is an image displayed on a display screen of the sample display.

For example, display images of 25 to 35 sample displays may be collected as sample images.

The "reference result" may be a result of detecting whether the sample display corresponding to the sample image is qualified by using the artificial vision detection method, or a result of knowing whether the sample display is qualified through a detection in advance.

In S21, it is determined whether a sample display that each sample image corresponds to is qualified by using the convolutional neural network, so as to obtain actual detection results of whether the plurality of sample displays are qualified. The convolutional neural network includes detection parameters.

For example, the detection parameters include a kernel function parameter and a penalty parameter.

It will be noted that a detection accuracy of the convolutional neural network is related to the detection parameters, i.e., related to the kernel function parameter and the penalty parameter. The detection accuracy of the convolutional neural network may be adjusted by adjusting the detection parameters.

In S22, the actual detection result of the sample display is compared with a respective reference result to determine whether the actual detection result is consistent with the respective reference result, and the detection parameters of the convolutional neural network are adjusted according to a comparison result.

For example, if the actual detection result of the sample display is inconsistent with the respective reference result (which indicates that the detection accuracy of the convolutional neural network does not satisfy a detection standard), the detection parameters of the convolutional neural network need to be adjusted to improve the detection accuracy of the convolutional neural network.

In S23, adjusting the detection parameters of the convolutional neural network repeatedly, until the actual detection results of the sample displays are stable.

It can be understood that the detection parameters of the convolutional neural network are repeatedly adjusted, until the actual detection result of each sample display is determined to be consistent with a respective reference result by using the convolutional neural network. This indicates that the detection accuracy of the convolutional neural network satisfies the detection standard, and the convolutional neural network may be used for the display defect detection.

In some embodiments, before determining whether the sample display that each sample image corresponds to is qualified by using the convolutional neural network in S21, as shown in FIG. 4, the display defect detection method further includes following S201.

In S201, a plurality of band-limited intrinsic mode function components are extracted from the sample image by using the complex variational mode decomposition method. Thus, noise signals in signals of the sample image may be removed.

Figure 5:
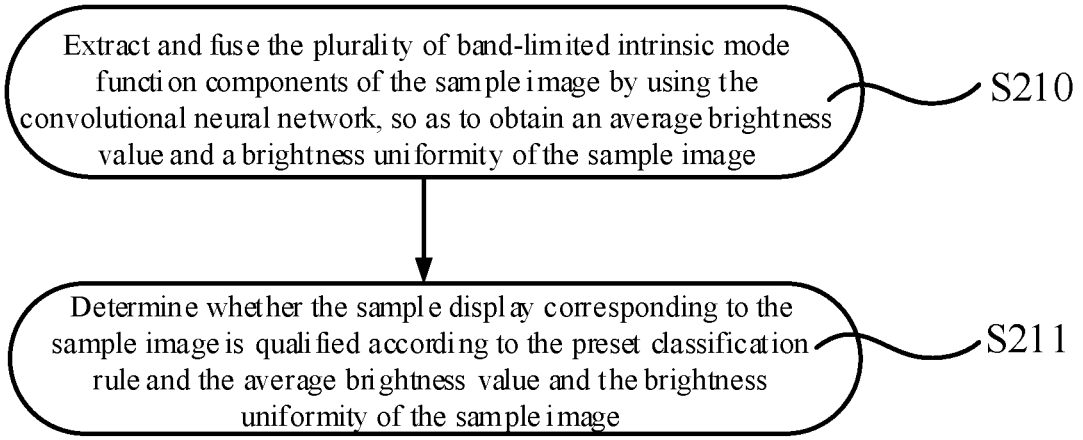

In some embodiments, as shown in FIG. 5, in S21, determining whether the sample display device that each sample image corresponds to is qualified by using the convolutional neural network to obtain the actual detection results of whether the plurality of sample displays are qualified, includes following S210 and S211.

In S210, the plurality of band-limited intrinsic mode function components of the sample image are extracted and fused by using the convolutional neural network, so as to obtain an average brightness value and a brightness uniformity of the sample image.

The plurality of band-limited intrinsic mode function components of the sample image are extracted and fused by using the convolutional neural network, so that determination features of the sample image, i.e., the average brightness value and the brightness uniformity of the sample image, are obtained.

In S211, it is determined whether the sample display corresponding to the sample image is qualified according to a preset classification rule and the average brightness value and the brightness uniformity of the sample image.

According to the preset classification rule, if the average brightness value and the brightness uniformity of the sample image satisfy the preset classification rule, the sample display corresponding to the sample image is determined to be qualified; and if the average brightness value, the brightness uniformity, or the average brightness value and the brightness uniformity of the sample image do not satisfy the preset classification rule, the sample display corresponding to the sample image is determined to be unqualified.

Figure 2:
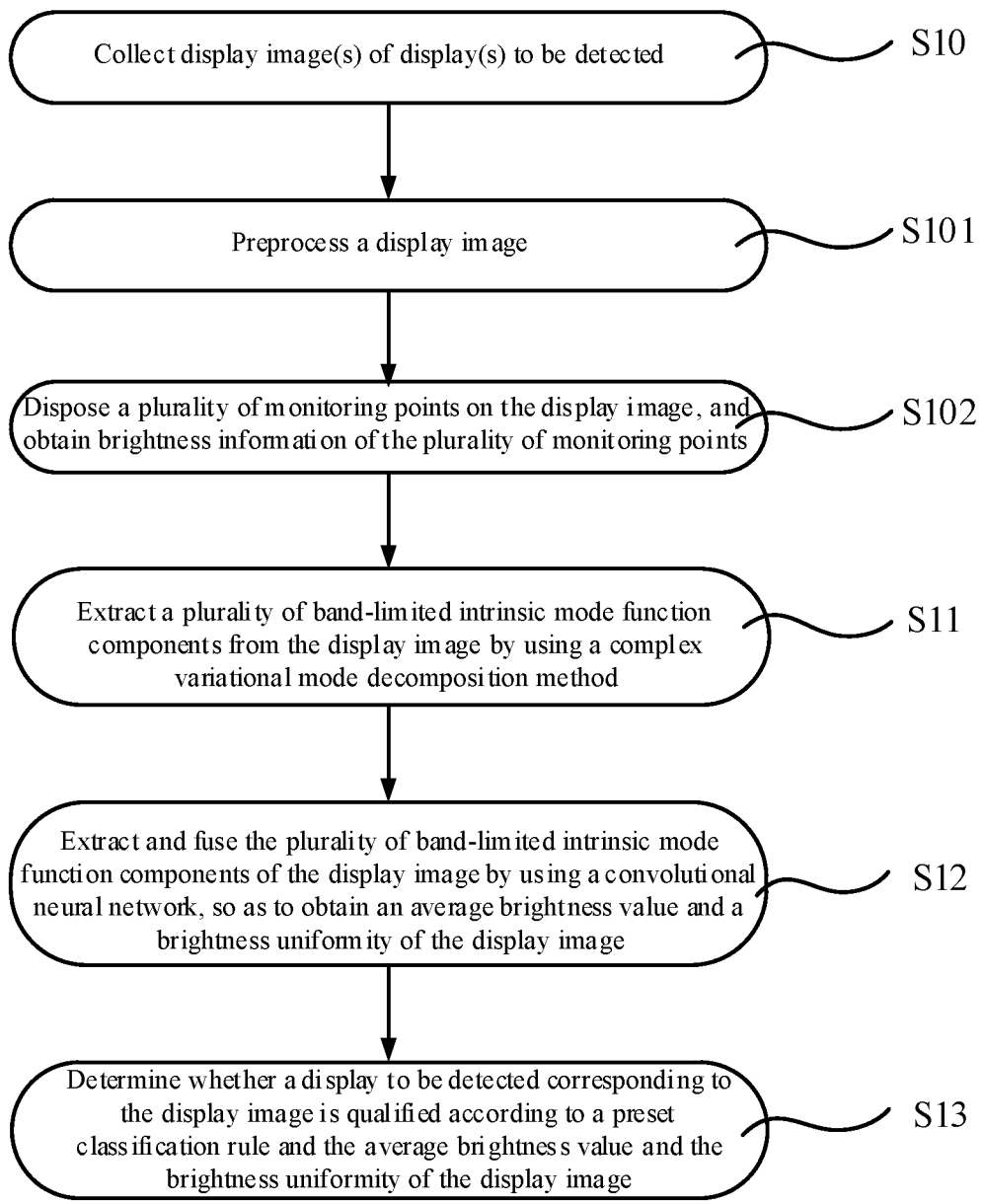

In some embodiments, as shown in FIG. 2, after the display image(s) of the display(s) to be detected are collected in S10, the display defect detection method further includes following S101.

In S101, the display image is preprocessed. The preprocessing includes at least one of image cropping, graying and filtering.

For example, one of a component method, a maximum method, an average method or a weighted average method may be used in the graying processing.

For example, the filtering processing may be one of mean filtering, median filtering, maximum-minimum filtering, bilateral filtering or guided filtering.

The image cropping is performed on the display image, so that a size of the display image meets requirements. The graying processing is performed on the display image to prepare for a subsequent processing of the image. The filtering processing is performed on the display image after the graying processing, which is conducive to reducing the noise signals in the signals of the display image.

In some embodiments, as shown in FIG. 2, after the display image(s) of the display(s) to be detected are collected in S10, the display defect detection method further includes S102.

Figure 8:
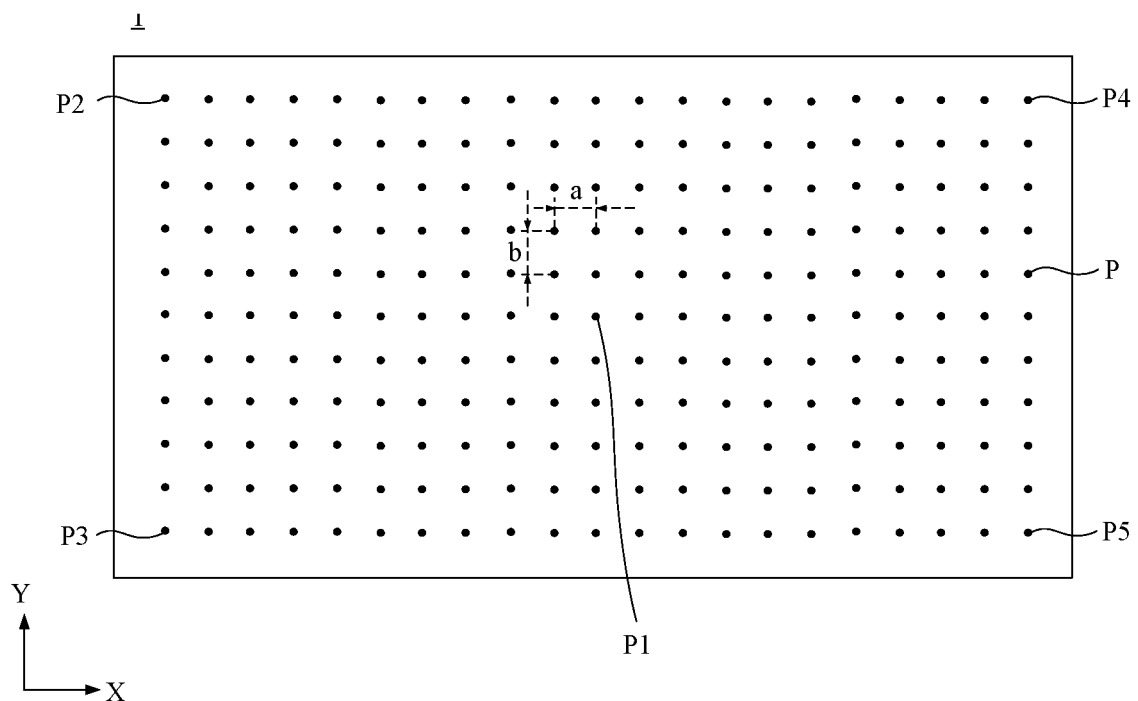
FIG. 8 is a display image of a display to be detected, in accordance with some embodiments of the present disclosure.

In S102, as shown in FIG. 8, a plurality of monitoring points P are provided on the display image 1, and brightness information of the plurality of monitoring points P is obtained.

The plurality of monitoring points P are arranged in an array. A distance a between two adjacent monitoring points P in a first direction X is substantially equal to a distance b between two adjacent monitoring points P in a second direction Y. The first direction X and the second direction Y intersect. For example, FIG. 8 shows the first direction X and the second direction Y that are perpendicular to each other.

The plurality of monitoring points P are arranged in the array, so that the monitoring points P are uniformly arranged on the display image 1. Thus, by obtaining the brightness information of the monitoring points P, brightness information of the display image 1 is accurately obtained.

Figure 3:
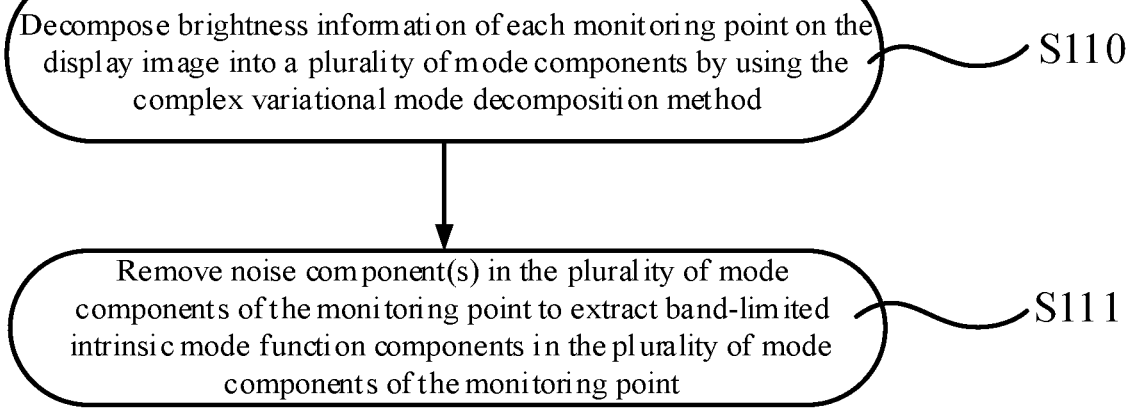

In some embodiments, as shown in FIG. 3, in S11, extracting the plurality of band-limited intrinsic mode function components from the display image by using the complex variational mode decomposition method, includes following S110 and S111.

In S110, brightness information of each monitoring point on the display image is decomposed into a plurality of modal components.

In S111, noise component(s) in the plurality of modal components of the monitoring point are removed to extract band-limited intrinsic mode function components in the plurality of modal components of the monitoring point.

Through the above method, the noise component(s) of the brightness information of each monitoring point on the display image are removed to extract the band-limited intrinsic mode function components of the monitoring point, which is conducive to improving an accuracy of detecting the average brightness value and the brightness uniformity of the display image in subsequent steps.

For example, as shown in FIG. 6, the workflow of the complex variational mode decomposition includes following S30 to S36.

In S30, a signal is converted to a complex domain by using the functional equation 1-1. It can be understood that the "signal" refers to a signal containing the brightness information of the monitoring point.

$$Z(f)=[1+\text{sgn}(f)]X(f) \quad (1\text{-}1)$$

In the equation 1-1, $Z(f)$ represents the signal converted to the complex domain; $\text{sgn}(f)$ is a step function; and $X(f)$ represents the signal containing the brightness information of the monitoring point.

In S31, relevant information n is initialized by using the functional equation 1-2.

$$n = 0, \left\{\hat{u}_k^1\right\}, \left\{\hat{\omega}_k^1\right\}, \hat{\lambda}^1 \quad (1\text{-}2)$$

In the equation 1-2, k represents the number of the decomposed modal components, and k is a positive integer;

$$\left\{\hat{u}_k^1\right\}$$

represents a k-th decomposed modal component;

$$\left\{\hat{\omega}_k^1\right\}$$

represents a center frequency of the k-th decomposed modal component; and $\hat{\lambda}^1$ represents a bandwidth of each decomposed modal component. The number k of the decomposed modal components may be artificially set as needed, so as to reduce the redundancy of the modal components.

In S32, n is cyclically updated by using the functional equation 1-3.

$$n=n+1 \quad (1\text{-}3)$$

In S33, $u_k$ is updated by using the functional equation 1-4, where k=1:k.

$$\hat{u}_k^{n+1} = \arg\min_{\hat{u}_k} L\left(\left\{\hat{u}_{t<k}^{n+1}\right\}, \left\{\hat{u}_{t\geq k}^n\right\}, \left\{\hat{\omega}_i^n\right\}, \hat{\lambda}^n\right) \quad (1\text{-}4)$$

The equation 1-4 represents a value of $\hat{u}_k^{n+1}$ when $$L\left(\left\{\hat{u}_{t<k}^{n+1}\right\}, \left\{\hat{u}_{t\geq k}^n\right\}, \left\{\hat{\omega}_i^n\right\}, \hat{\lambda}^n\right)$$

is a minimum value.

In S34, $\omega_k$ is updated by using the functional equation 1-5, where k=1:k.

$$\hat{\omega}_k^{n+1} = \arg\min_{\hat{\omega}_k} L\left(\left\{\hat{u}_i^{n+1}\right\}, \left\{\hat{u}_{t<k}^n\right\}, \left\{\hat{\omega}_{t\geq k}^n\right\}, \hat{\lambda}^n\right) \quad (1\text{-}5)$$

The equation 1-5 represents a value of $\hat{\omega}_k^{n+1}$ when $$L\left(\left\{\hat{u}_i^{n+1}\right\}, \left\{\hat{u}_{t<k}^n\right\}, \left\{\hat{\omega}_{t\geq k}^n\right\}, \hat{\lambda}^n\right)$$

is a minimum value.

In S35, $\lambda$ is updated by using the functional equation 1-6.

$$\hat{\lambda}^{n+1} = \hat{\lambda}^n + \tau\left(x - \sum_k \hat{u}_k^{n+1}\right) \quad (1\text{-}6)$$

In the equation 1-6, $$\tau\left(x - \sum_k \hat{u}_k^{n+1}\right)$$

represents a noise tolerance.

In S36, determination is made according to the functional equation 1-7.

$$\sum_k \left\|\hat{u}_k^{n+1} - \hat{u}_k^n\right\|_2^2 / \left\|\hat{u}_k^n\right\|_2^2 < \varepsilon \quad (1\text{-}7)$$

In the equation 1-7, $\varepsilon$ represents a precision convergence criterion.

If $$\sum_k \left\|\hat{u}_k^{n+1} - \hat{u}_k^n\right\|_2^2 / \left\|\hat{u}_k^n\right\|_2^2 < \varepsilon$$

holds, the band-limited intrinsic mode function component $\{u_k\}$ is output. If $$\sum_k \left\|\hat{u}_k^{n+1} - \hat{u}_k^n\right\|_2^2 / \left\|\hat{u}_k^n\right\|_2^2 < \varepsilon$$

does not hold (which indicates that the decomposed modal component is a noise component), the workflow is returned to S32, and S32 to S36 are repeated.

It can be understood that until k band-limited intrinsic mode function components are determined to be obtained, the workflow of the complex variational mode decomposition ends.

In some embodiments, in S12, extracting and fusing the plurality of band-limited intrinsic mode function components of the display image by using the convolutional neural network to obtain the average brightness value and brightness uniformity of the display image, includes following step(s):

Band-limited intrinsic mode function components of brightness information of a monitoring point on the display image are extracted by using the convolutional neural network, so that a brightness corresponding to the band-limited intrinsic mode function components of the monitoring point is used as the average brightness value of the display image.

It will be noted that the single monitoring point that is extracted from the display image should be a representative monitoring point that may represent the overall brightness of the display image.

For example, as shown in FIG. 8, band-limited intrinsic mode function components of brightness information of a monitoring point P1 located at a center of the display image 1 may be extracted, so that a brightness corresponding to the band-limited intrinsic mode function components of the monitoring point P1 is used as the average brightness value of the display image 1.

Alternatively, band-limited intrinsic mode function components of brightness information of monitoring points on the display image are extracted by using the convolutional neural network; and an average value of brightnesses corresponding to the band-limited intrinsic mode function components of the brightness information of the monitoring points is calculated as the average brightness value of the display image.

It can be understood that the average value of the brightnesses corresponding to the band-limited intrinsic mode function components of the brightness information of the monitoring points is used as the average brightness value of the display image to represent the overall brightness of the display image, so that the overall brightness of the display image may be accurately reflected.

For example, as shown in FIG. 8, band-limited intrinsic mode function components of brightness information of all the monitoring points P on the display image 1 may be extracted. An average value of brightnesses corresponding to the band-limited intrinsic mode function components of the brightness information of all the monitoring points P is calculated as the average brightness value of display image 1.

Alternatively, as shown in FIG. 8, in a case where the display image 1 is in a shape of a polygon (e.g., rectangle), band-limited intrinsic mode function components of brightness information of monitoring points (e.g., monitoring points P2, P3, P4, and P5 shown in FIG. 8) including, located at each corner of the display image 1, at least one corresponding monitoring point, and the band-limited intrinsic mode function components of the brightness information of the monitoring point P1 located at the center of the display image are extracted by using the convolutional neural network. An average value of brightnesses corresponding to the extracted band-limited intrinsic mode function components of the brightness information of the monitoring points (e.g., the monitoring points P2, P3, P4 and P5) including, located at each corner, the at least one corresponding monitoring point, and the monitoring point P1 located at the center, is calculated as the average brightness value of the display image 1.

The average value of the brightnesses corresponding to the band-limited intrinsic mode function components of the brightness information of the monitoring points including, located at each corner of the display image, the at least one corresponding monitoring point, and the monitoring point located at the center of the display image, is calculated as the average brightness value of the display image. These monitoring points are distributed in various regions of the display image. Thus, the overall brightness of the display image may be reflected more accurately.

In some embodiments, in S12, extracting and fusing the plurality of band-limited intrinsic mode function components of the display image by using the convolutional neural network to obtain the average brightness value and brightness uniformity of the display image, further includes following steps.

Band-limited intrinsic mode function components of a monitoring point with least brightness information and band-limited intrinsic mode function components of a monitoring point with most brightness information are extracted; and a ratio of a brightness corresponding to the band-limited intrinsic mode function components of the monitoring point with least brightness information to a brightness corresponding to the band-limited intrinsic mode function components of the monitoring point with most brightness information is calculated, so as to obtain the brightness uniformity of the display image.

It can be understood that the ratio of the brightness corresponding to the band-limited intrinsic mode function components of the monitoring point with least brightness information to the brightness corresponding to the band-limited intrinsic mode function components of the monitoring point with most brightness information is used as the brightness uniformity of the display image to represent the overall brightness uniformity of the display image.

Figure 7:
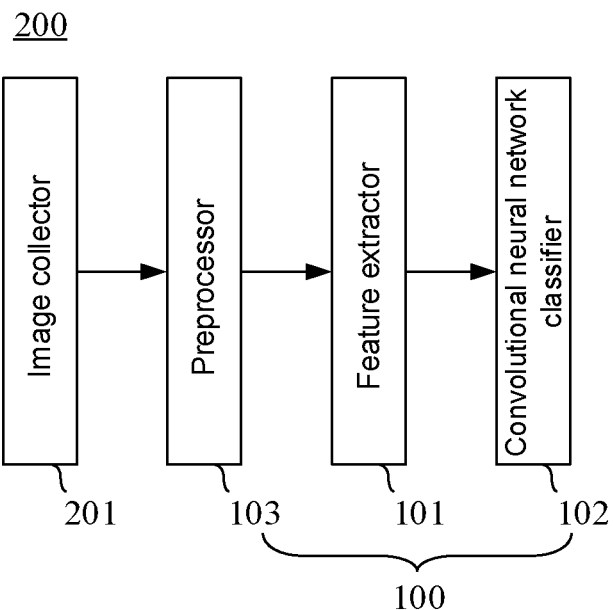
FIG. 7 is a structural diagram of a display defect detection apparatus, in accordance with some embodiments of the present disclosure.

Some embodiments of the present disclosure further provide a display defect detection apparatus. As shown in FIG. 7, the display defect detection apparatus 100 includes a feature extractor 101 and a convolutional neural network classifier 102.

The feature extractor 101 is coupled to an image collector 201. The feature extractor 101 is configured to: obtain display image(s) of display(s) to be detected collected by the image collector 201; and extract a plurality of band-limited intrinsic mode function components from the display image by using a complex variational mode decomposition method.

The convolutional neural network classifier 102 is coupled to the feature extractor 101. The convolutional neural network classifier 102 is configured to: extract and fuse the plurality of band-limited intrinsic mode function components, so as to obtain an average brightness value and a brightness uniformity of the display image; and determine whether the display to be detected corresponding to the display image is qualified according to a preset classification rule and the average brightness value and the brightness uniformity of the display image.

In the display defect detection apparatus 100, the feature extractor 101 extracts the plurality of band-limited intrinsic mode function components from the display image by using the complex variational mode decomposition method, so that noise signals in signals of the display image may be removed. The convolutional neural network classifier 102 extracts and fuses the plurality of band-limited intrinsic mode function components, so as to obtain the average brightness value and the brightness uniformity of the display image for determining the display image. The average brightness value and the brightness uniformity of the display image are determined by using the unified preset classification rule, so as to realize the detection of the Hotspot phenomenon of the display image, thereby determining whether the display to be detected corresponding to the display image is qualified through the detection of the Hotspot phenomenon of the display image.

In some embodiments, as shown in FIG. 7, the display defect detection apparatus 100 further includes a preprocessor 103. The preprocessor 103 is coupled between the image collector 201 and the feature extractor 101. The preprocessor 103 is configured to: obtain the display image of the display to be detected collected by the image collector 201; preprocess the display image; and transmit the preprocessed display image to the feature extractor 101. The preprocessing includes at least one of image cropping, graying and filtering.

In the display defect detection apparatus 100, the preprocessor 103 performs the image cropping on the display image to make a size of the display image meet requirements, performs the graying processing on the display image to prepare for a subsequent processing of the image, and performs the filtering processing on the display image after the graying processing to reduce the noise signals in the signals of the display image.

Some embodiments of the present disclosure further provide a display defect detection system. As shown in FIG. 7, the display defect detection system 200 includes the image collector 201 and the display defect detection apparatus 100 in any one of the above embodiments. The display defect detection apparatus 100 is coupled to the image collector 201. The image collector 201 is configured to collect the display image(s) of the display(s) to be detected.

The display defect detection system 200 has the same beneficial effects as the display defect detection apparatus 100 in any one of the above embodiments, which will not be repeated here.

Figure 9:
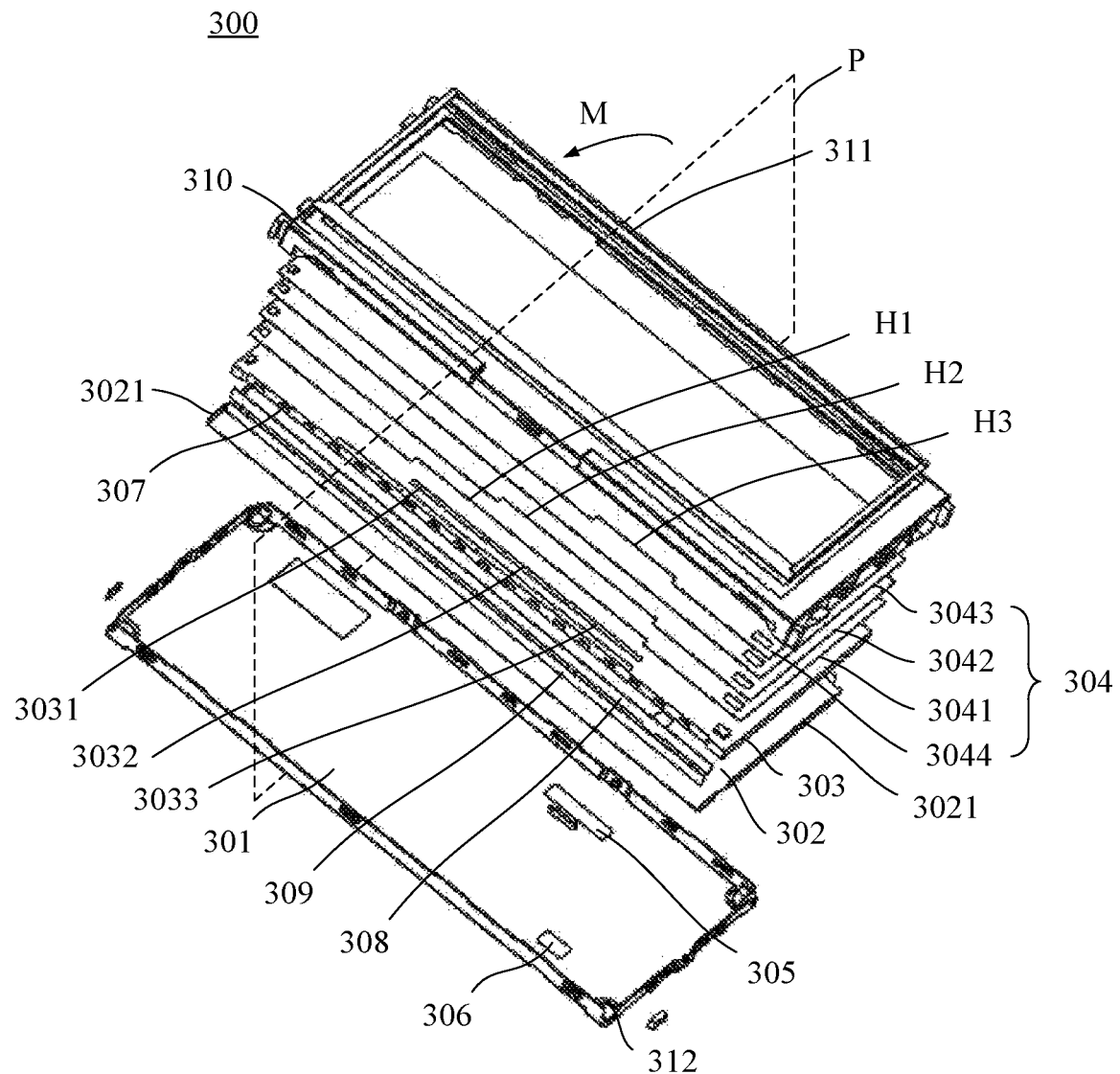
FIG. 9 is a structural diagram of a backlight module, in according with some embodiments of the present disclosure.
Figure 10:
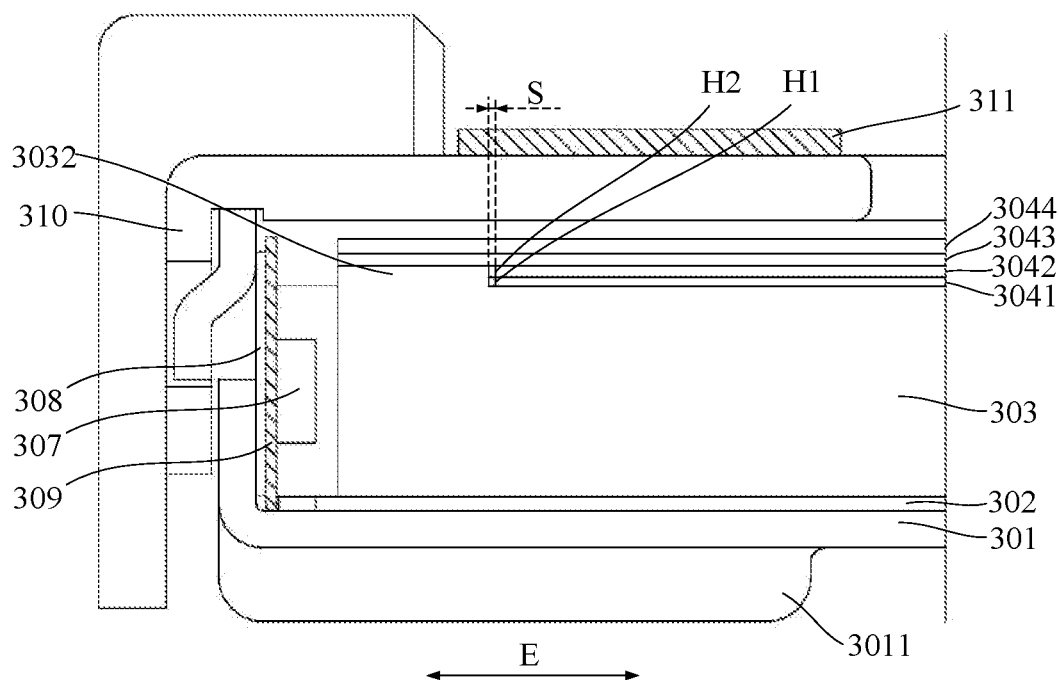
FIG. 10 is a sectional view of the backlight module in FIG. 9 taken along the P plane.

As shown in FIGS. 9 and 10, some embodiments of the present disclosure further provide a backlight module. The backlight module 300 includes a back plate 301, and a reflective sheet 302, a light guide plate (LGP) 303 and a plurality of optical films 304 that are stacked on the back plate 301 in sequence.

As shown in FIGS. 9 and 10, a plurality of support legs 3011 are provided on a surface (i.e., a bottom surface) of the back plate 301 away from a light exit side M of the backlight module 300, and are used for supporting the backlight module 300. Rubber pads 312 are installed at four corners of a surface of the back plate 301 proximate to the light exit side M of the backlight module 300. The rubber pads 312 are used for supporting the plurality of optical films 304 in a direction perpendicular to a plane where the back plate 301 is located, and for providing buffer protection for the plurality of optical films 304 along the plane where the back plate 301 is located. A compression ratio of the rubber pad 312 is 60%. An insulating tape 305 is adhered to the back plate 301, and may be used for preventing static electricity from entering the backlight module 300. A black light-shielding tape 306 is further adhered to the back plate 301, and may prevent light in the backlight module 300 from leaking out through holes in the back plate 301.

As shown in FIG. 9, the reflective sheet 302 may reflect light reflected to a surface thereof to the light guide plate 303, so as to improve a utilization rate of a light source. Moreover, the reflective sheet 302 includes a bending portion 3021 located at an edge of the reflective sheet 302, and the bending portion 3021 is bent toward a direction away from the back plate 301, so that a side of the reflective sheet 302 may also reflect light, which may further improve the utilization rate of the light source.

As shown in FIG. 9, the backlight module 300 further includes a plurality of light-emitting devices 307 fixed to a surface of the light guide plate 303. The light guide plate 303 propagates light emitted from the plurality of light-emitting devices 307 through a light exit surface of the light guide plate 303.

For example, the light-emitting device 307 is a light-emitting diode (LED). An orthographic projection of the light-emitting diode on the surface of the light guide plate 303 is in a shape of a rectangle, and a length of the rectangle is in a range of 28 mm to 32 mm, inclusive. For example, the length of the rectangle is 28 mm, 29 mm, 30 mm, 31 mm or 32 mm. A width of the rectangle is in a range of 12 mm to 16 mm, inclusive. For example, the width of the rectangle is 12 mm, 13 mm, 14 mm, 15 mm or 16 mm.

For example, the light-emitting devices 307 are adhered to the surface of the light guide plate 303 through an adhesive tape 308, and a flexible printed circuit (FPC) 309 is further adhered to the adhesive tape 308. The flexible printed circuit 309 is electrically connected to the plurality of light-emitting devices 307, so as to provide voltage signals to the plurality of light-emitting devices 307.

As shown in FIGS. 9 and 10, a plurality of protrusions are provided in an edge region, close to the plurality of light-emitting devices 307, of a surface of the light guide plate 303 away from the back plate 301. Accordingly, openings are provided in edges of the plurality of optical films 304. An opening of the optical film 304 corresponds to a protrusion on the light guide plate 303, so that the opening of the optical film 304 may be engaged with the protrusion of the light guide plate 303, thereby limiting a displacement of the optical film 304 along a length extending direction of the edge of the optical film 304, so as to prevent the displacement of the optical film 304 from affecting an effect of the optical film 304 on exit light.

Moreover, each optical film 304 is adhered to the light guide plate 303 through the adhesive tape 308, so that the optical film 304 is prevented from moving relative to the light guide plate 303.

For example, as shown in FIG. 9, the plurality of optical films 304 include a first diffusion sheet 3041, a first prism sheet 3042, a second prism sheet 3043 and a second diffusion sheet 3044 that are stacked on the light guide plate 303 in sequence.

The first diffusion sheet 3041 atomizes light through refraction and reflection of diffusion substances included therein, so as to increase an amount of exit light along a direction perpendicular to the first diffusion sheet 3041 to improve front luminance, thereby concentrating light emitted from the light guide plate 303 to be uniformly projected onto the first prism sheet 3042. The first prism sheet 3042 is a 90° lower prism sheet (i.e., a propagation direction of light is deflected by 90° after passing through the lower prism sheet). The second prism sheet 3043 is a 0° upper prism sheet (i.e., the propagation direction of light is deflected by 0° after passing through the upper prism sheet). When light passes through the first prism sheet 3042 and the second prism sheet 3043, only light incident within a preset angle range may exit through refraction, and light outside the preset angle range is reflected because a refraction condition is not satisfied. The reflected light propagates to the reflective sheet 302, and propagates to the first prism sheet 3042 again after the reflection of the reflective sheet 302. In this way, most of the light may exit from the first prism sheet 3042 and the second prism sheet 3043 after a plurality of reflections, so that the utilization rate of the light source may be improved. The second diffusion sheet 3044 may atomize light emitted from the second prism sheet 3043 to make the light exit uniformly, and may protect the second prism sheet 3043.

For example, as shown in FIG. 9, a first protrusion 3031, a second protrusion 3032 and a third protrusion 3033 are provided on the surface of the light guide plate 303 away from the back plate 301. The second protrusion 3032 is located on a surface of the first protrusion 3031 away from the light guide plate 303, and the second protrusion 3032 and the first protrusion 3031 are of an integral structure. The third protrusion 3033 is located on a surface of the second protrusion 3032 away from the light guide plate 303, and the third protrusion 3033 and the second protrusion 3032 are of an integral structure. That is, the first protrusion 3031, the second protrusion 3032 and the third protrusion 3033 are of an integral structure.

Accordingly, the first diffusion sheet 3041 is provided with a first opening H1 therein, the first prism sheet 3042 is provided with a second opening H2 therein, and the second diffusion sheet 3044 is provided with a third opening H3 therein. The first opening H1 of the first diffusion sheet 3041 is engaged with the first protrusion 3031 of the light guide plate 303, the second opening H2 of the first prism sheet 3042 is engaged with the second protrusion 3032 of the light guide plate 303, and the third opening H3 of the second diffusion sheet 3044 is engaged with the third protrusion 3033 of the light guide plate 303.

Referring to FIG. 10, along a direction E parallel to a plane where the light guide plate 303 is located and perpendicular to the surface of the light guide plate 303 where the plurality of light-emitting devices 307 are disposed, the second opening H2 of the first prism sheet 3042 and the second protrusion 3032 of the light guide plate 303 have a distance S therebetween.

In the related art, along a direction parallel to a plane where a light guide plate is located and perpendicular to a surface of the light guide plate where a plurality of light-emitting devices are disposed, a second opening of a first prism sheet and a second protrusion of the light guide plate are in contact, and have no distance therebetween. In this way, light may propagate from the second protrusion of the light guide plate to the first prism sheet, so that more light exits from a light exit region of the backlight module corresponding to the second protrusion. That is, more light exits from the light exit region of the backlight module close to the light-emitting devices. Thus, a region of a display picture of a display close to the light-emitting devices has a large brightness, and a region of the display picture of the display away from the light-emitting devices has a small brightness, so that the display picture shows the Hotspot phenomenon.

In some embodiments of the present disclosure, the Hotspot phenomenon of the display image of the display is detected by using the display defect detection method. In a case where the display to be detected corresponding to the display image is determined to be unqualified, the distance S between the second opening H2 and the second protrusion 3032 may be set in the direction E, so that light cannot directly propagate from the second protrusion of the light guide plate to the first prism sheet. The light exiting from the second protrusion of the light guide plate propagates to the first prism sheet through air, so that a propagation efficiency of the light incident on the first prism sheet through the second opening H2 may be reduced. Thus, an amount of light exiting from a light exit region of the backlight module close to the light-emitting devices is reduced, so that a brightness of a region of the display picture close to the light-emitting devices is reduced, so as to reduce the Hotspot phenomenon of the display picture of the display.

Then, the Hotspot phenomenon of the display image of the display is detected again by using the display defect detection method. In a case where the display to be detected corresponding to the display image is determined to be still unqualified, the Hotspot phenomenon of the display picture of the display may be reduced by increasing the distance S between the second opening H2 and the second protrusion 3032, until the display to be detected corresponding to the display image is determined to be qualified. The final distance S is obtained.

As shown in FIG. 9, the backlight module 300 further includes a rubber frame 310 around the backlight module 300, and is used for supporting the display. A foam double-sided adhesive 311 is provided on a surface of the rubber frame 310 proximate to the light exit side M of the backlight module 300, and is used for adhering the display to the backlight module 300, so as to prevent the display screen from being damaged caused by shaking of the display during transportation.

Figure 11:
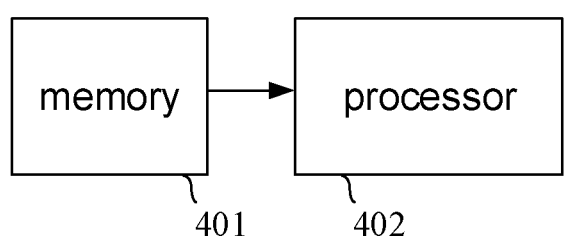
FIG. 11 is a structural diagram of an electronic device, in accordance with some embodiments of the present disclosure.

Some embodiments of the present disclosure further provide an electronic device. As shown in FIG. 11, the electronic device 400 includes a memory 401 and a processor 402. The memory 401 stores computer program instructions. The processor 402 is configured to run the computer program instructions to execute the display defect detection method in any one of the above embodiments.

Some embodiments of the present disclosure further provide a non-transitory computer-readable storage medium storing the computer program instructions. When the computer program instructions run on the processor, the processor executes the display defect detection method in any one of the above embodiments.

For example, the non-transitory computer-readable storage medium may include, but is not limited to, a magnetic storage device (e.g., a hard disk, a floppy disk or a magnetic tape), an optical disk (e.g., a compact disk (CD), a digital versatile disk (DVD)), a smart card or a flash memory device (e.g., an erasable programmable read-only memory (EPROM), a card, a stick or a key driver). The various kinds of non-transitory computer-readable storage media described in the present disclosure may represent one or more devices and/or other machine-readable storage media for storing information. The term "machine-readable storage media" may include, but is not limited to, wireless channels and various kinds of other media capable of storing, containing and/or carrying instructions and/or data.

Some embodiments of the present disclosure further provide a computer program product. The computer program product includes computer program instructions. When the computer program instructions are executed on a computer, the computer program instructions cause the computer to execute the display defect detection method in any one of the above embodiments.

Some embodiments of the present disclosure further provide a computer program. When the computer program is executed on a computer, the computer program causes the computer to execute the display defect detection method in any one of the above embodiments.

Beneficial effects of the non-transitory computer-readable storage medium, the computer program product, and the computer program are the same as the beneficial effects of the display defect detection method in some embodiments described above, and will not be repeated here.

The foregoing descriptions are merely specific implementations of the present disclosure. However, the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A display defect detection method, comprising:
collecting at least one display image of at least one display to be detected;
extracting a plurality of band-limited intrinsic mode function components from a display image in the at least one display image by using a complex variational mode decomposition method;
extracting and fusing, by using a convolutional neural network, the plurality of band-limited intrinsic mode function components extracted from the display image, so as to obtain an average brightness value and a brightness uniformity of the display image; and
determining whether a display to be detected in the at least one display to be detected corresponding to the display image is qualified according to a preset classification rule and the average brightness value and the brightness uniformity of the display image.

2. The display defect detection method according to claim 1, wherein the preset classification rule includes:
if the average brightness value of the display image is greater than or equal to a preset brightness value, and the brightness uniformity of the display image is greater than or equal to a preset brightness uniformity, determining that the display to be detected corresponding to the display image is qualified; and
if not, determining that the display to be detected corresponding to the display image is unqualified.

3. The display defect detection method according to claim 2, wherein before collecting the at least one display image of the at least one display to be detected, the display defect detection method further comprises:
collecting display images of a plurality of sample displays as sample images;
obtaining reference results of whether the sample displays corresponding to respective sample images are qualified;
determining whether a sample display in the plurality of sample displays that each sample image corresponds to is qualified by using the convolutional neural network, so as to obtain actual detection results of whether the plurality of sample displays are qualified; the convolutional neural network including detection parameters;
comparing an actual detection result of a sample display in the plurality of sample displays with a respective reference result to determine whether the actual detection result is consistent with the respective reference result;
adjusting the detection parameters of the convolutional neural network according to a comparison result; and
adjusting the detection parameters of the convolutional neural network repeatedly, until the actual detection results of the plurality of sample displays are stable.

4. The display defect detection method according to claim 1, wherein before collecting the at least one display image of the at least one display to be detected, the display defect detection method further comprises:
collecting display images of a plurality of sample displays as sample images;
obtaining reference results of whether the sample displays corresponding to respective sample images are qualified;
determining whether a sample display in the plurality of sample displays that each sample image corresponds to is qualified by using the convolutional neural network, so as to obtain actual detection results of whether the plurality of sample displays are qualified; the convolutional neural network including detection parameters;
comparing an actual detection result of a sample display in the plurality of sample displays with a respective reference result to determine whether the actual detection result is consistent with the respective reference result;
adjusting the detection parameters of the convolutional neural network according to a comparison result; and
adjusting the detection parameters of the convolutional neural network repeatedly, until the actual detection results of the plurality of sample displays are stable.

5. The display defect detection method according to claim 4, wherein before determining whether the sample display that each sample image corresponds to is qualified by using the convolutional neural network, the display defect detection method further comprises:
extracting a plurality of band-limited intrinsic mode function components from the sample image by using the complex variational mode decomposition method.

6. The display defect detection method according to claim 5, wherein determining whether the sample display that each sample image corresponds to is qualified by using the convolutional neural network, includes:
extracting and fusing, by using the convolutional neural network, the plurality of band-limited intrinsic mode function components extracted from the sample image, so as to obtain an average brightness value and a brightness uniformity of the sample image; and
determining whether the sample display corresponding to the sample image is qualified according to the preset classification rule and the average brightness value and the brightness uniformity of the sample image.

7. The display defect detection method according to claim 4, wherein comparing the actual detection result of the sample display with the respective reference result to determine whether the actual detection result is consistent with the respective reference result, and adjusting the detection parameters of the convolutional neural network according to the comparison result, include:
if the actual detection result of the sample display is inconsistent with the respective reference result, adjusting the detection parameters of the convolutional neural network.

8. The display defect detection method according to claim 4, wherein the detection parameters include a kernel function parameter and a penalty parameter.

9. The display defect detection method according to claim 1, wherein after collecting the at least one display image of the at least one display to be detected, the display defect detection method further comprises:
preprocessing the display image; the preprocessing including at least one of image cropping, graying and filtering.

10. The display defect detection method according to claim 1, wherein after collecting the at least one display image of the at least one display to be detected, the display defect detection method further comprises:
disposing a plurality of monitoring points on the display image; and
obtaining brightness information of the plurality of monitoring points;
wherein the plurality of monitoring points are arranged in an array; a distance between two adjacent monitoring points in a first direction is substantially equal to a distance between two adjacent monitoring points in a second direction; and the first direction and the second direction intersect.

11. The display defect detection method according to claim 10, wherein extracting the plurality of band-limited intrinsic mode function components from the display image by using the complex variational mode decomposition method, includes:
   decomposing brightness information of each monitoring point on the display image into a plurality of modal components by using the complex variational mode decomposition method; and
   removing at least one noise component in the plurality of modal components of the monitoring point to extract band-limited intrinsic mode function components in the plurality of modal components of the monitoring point.

12. The display defect detection method according to claim 10, wherein extracting and fusing, by using a convolutional neural network, the plurality of band-limited intrinsic mode function components extracted from the display image to obtain the average brightness value and the brightness uniformity of the display image, includes:
   extracting band-limited intrinsic mode function components of brightness information of a monitoring point in the plurality of monitoring points on the display image by using the convolutional neural network, so that a brightness corresponding to the band-limited intrinsic mode function components of the monitoring point is used as the average brightness value of the display image.

13. The display defect detection method according to claim 10, wherein extracting and fusing, by using a convolutional neural network, the plurality of band-limited intrinsic mode function components extracted from the display image to obtain the average brightness value and the brightness uniformity of the display image, includes:
   extracting band-limited intrinsic mode function components of a monitoring point with least brightness information in the plurality of monitoring points and band-limited intrinsic mode function components of a monitoring point with most brightness information in the plurality of monitoring points; and
   calculating a ratio of a brightness corresponding to the band-limited intrinsic mode function components of the monitoring point with least brightness information to a brightness corresponding to the band-limited intrinsic mode function components of the monitoring point with most brightness information, so as to obtain the brightness uniformity of the display image.

14. The display defect detection method according to claim 10, wherein extracting and fusing, by using a convolutional neural network, the plurality of band-limited intrinsic mode function components extracted from the display image to obtain the average brightness value and the brightness uniformity of the display image, includes:
   extracting band-limited intrinsic mode function components of brightness information of at least two monitoring points in the plurality of monitoring points on the display image by using the convolutional neural network; and
   calculating an average value of brightnesses corresponding to the band-limited intrinsic mode function components of the brightness information of the at least two monitoring points as the average brightness value of the display image.

15. The display defect detection method according to claim 10, wherein the display image is in a shape of a polygon; extracting and fusing, by using a convolutional neural network, the plurality of band-limited intrinsic mode function components extracted from the display image to obtain the average brightness value and the brightness uniformity of the display image, includes:
   extracting band-limited intrinsic mode function components of brightness information of monitoring points including, located at each corner of the display image, at least one corresponding monitoring point in the plurality of monitoring points, and band-limited intrinsic mode function components of brightness information of a monitoring point in the plurality of monitoring points located at a center of the display image by using the convolutional neural network; and
   calculating an average value of brightnesses corresponding to the extracted band-limited intrinsic mode function components of the brightness information of the monitoring points including, located at each corner, the at least one corresponding monitoring point, and the monitoring point located at the center as the average brightness value of the display image.

16. An electronic device comprising a memory and a processor, wherein the memory stores computer program instructions; and
   the processor is configured to run the computer program instructions to execute the display defect detection method according to claim 1.

17. A non-transitory computer-readable storage medium storing computer program instructions, wherein when the computer program instructions run on a processor, the processor executes the display defect detection method according to claim 1.

18. A display defect detection apparatus, comprising:
   a feature extractor coupled to an image collector; wherein the feature extractor is configured to: obtain at least one display image of at least one display to be detected collected by the image collector; and extract a plurality of band-limited intrinsic mode function components from a display image in the at least one display image by using a complex variational mode decomposition method; and
   a convolutional neural network classifier coupled to the feature extractor; wherein the convolutional neural network classifier is configured to: extract and fuse the plurality of band-limited intrinsic mode function components extracted from the display image, so as to obtain an average brightness value and a brightness uniformity of the display image; and determine whether a display to be detected in the at least one display to be detected corresponding to the display image is qualified according to a preset classification rule and the average brightness value and the brightness uniformity of the display image.

19. The display defect detection apparatus according to claim 18, further comprising:
   a preprocessor coupled between the image collector and the feature extractor; wherein the preprocessor is configured to: obtain the display image of the display to be detected collected by the image collector; preprocess the display image; and transmit the preprocessed display image to the feature extractor; wherein the preprocessing includes at least one of image cropping, graying and filtering.

20. A display defect detection system, comprising:
   an image collector configured to collect at least one display image of at least one display to be detected; and the display defect detection apparatus according to claim 18, the display defect detection apparatus being coupled to the image collector.

\* \* \* \* \*